(12) United States Patent
Faus et al.

(10) Patent No.: US 7,966,319 B2
(45) Date of Patent: Jun. 21, 2011

(54) SYSTEMS AND METHODS FOR A RATING SYSTEM

(75) Inventors: Norman Lee Faus, Holly Springs, NC (US); Jason Guiditta, Holly Springs, NC (US); Jason S. Hibbets, Raleigh, NC (US); John R. Mattox, Raleigh, NC (US); Darryl L. Pierce, Apex, NC (US); Frank Wierzbicki, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 129 days.

(21) Appl. No.: 11/759,785

(22) Filed: Jun. 7, 2007

(65) Prior Publication Data

US 2008/0306932 A1    Dec. 11, 2008

(51) Int. Cl.
G06F 17/30    (2006.01)
G06F 7/00    (2006.01)

(52) U.S. Cl. ......... 707/723; 707/748; 707/765; 707/770

(58) Field of Classification Search .................. None
See application file for complete search history.

(56) References Cited

U.S. PATENT DOCUMENTS

| | | |
|---|---|---|
| 6,223,165 B1 | 4/2001 | Lauffer |
| 6,374,261 B1 | 4/2002 | Alvarez et al. |
| 6,446,058 B1 | 9/2002 | Brown |
| 6,477,667 B1 | 11/2002 | Levi et al. |
| 6,493,702 B1 | 12/2002 | Adar et al. |
| 6,519,629 B2 | 2/2003 | Harvey et al. |
| 6,691,162 B1 | 2/2004 | Wick |
| 6,735,592 B1 | 5/2004 | Neumann et al. |
| 6,739,508 B2 * | 5/2004 | Ushioda et al. ............... 235/386 |
| 6,938,068 B1 | 8/2005 | Kraft et al. |
| 6,988,126 B2 | 1/2006 | Wilcock et al. |
| 7,007,235 B1 | 2/2006 | Hussein et al. |
| 7,028,228 B1 | 4/2006 | Lovy et al. |
| 7,069,480 B1 | 6/2006 | Lovy et al. |
| 7,159,011 B1 | 1/2007 | Knight et al. |
| 7,359,894 B1 | 4/2008 | Liebman et al. |
| 7,382,247 B2 | 6/2008 | Welch et al. |
| 7,437,382 B2 | 10/2008 | Zhang et al. |
| 7,472,071 B2 | 12/2008 | Marks et al. |
| 7,543,232 B2 | 6/2009 | Easton et al. |

(Continued)

FOREIGN PATENT DOCUMENTS

WO    99/39279    8/1999

(Continued)

OTHER PUBLICATIONS

U.S. Appl. No. 11/747,220, filed May 10, 2007, Jason S. Hibbets.

(Continued)

*Primary Examiner* — Greta L Robinson
*Assistant Examiner* — James J Wilcox
(74) *Attorney, Agent, or Firm* — MH2 Technology Law Group LLP (57) ABSTRACT

An embodiment relates generally to a method of searching. The method includes providing for a knowledgebase item and associating a review for the knowledgebase item. The method also includes associating a rating for the knowledgebase item and developing a ranking associated with the knowledgebase item based on at least one the review and the rating. The method further includes displaying the knowledgebase item based on the ranking in subsequent searches that include the knowledgebase item.

23 Claims, 7 Drawing Sheets

U.S. PATENT DOCUMENTS

| | | | |
|---|---|---|---|
| 7,546,254 B2 | 6/2009 | Bednarek | |
| 7,548,914 B2 | 6/2009 | Bell et al. | |
| 7,558,828 B1 | 7/2009 | Panzer | |
| 7,600,160 B1 | 10/2009 | Lovy et al. | |
| 7,603,350 B1 | 10/2009 | Guha | |
| 7,613,690 B2 * | 11/2009 | Chowdhury et al. | 1/1 |
| 7,617,127 B2 * | 11/2009 | Hunt et al. | 705/26 |
| 7,664,747 B2 | 2/2010 | Petras et al. | |
| 7,668,838 B2 | 2/2010 | Baio et al. | |
| 7,698,242 B2 | 4/2010 | Van Camp et al. | |
| 7,752,314 B2 | 7/2010 | Trevor et al. | |
| 7,788,322 B2 | 8/2010 | Busey | |
| 2001/0032244 A1 | 10/2001 | Neustel | |
| 2001/0037317 A1 | 11/2001 | Freiwirth et al. | |
| 2002/0049738 A1 * | 4/2002 | Epstein | 707/1 |
| 2002/0055935 A1 | 5/2002 | Rosenblum | |
| 2002/0087520 A1 | 7/2002 | Meyers | |
| 2002/0123983 A1 | 9/2002 | Riley et al. | |
| 2002/0169783 A1 | 11/2002 | Kreulen et al. | |
| 2002/0174106 A1 | 11/2002 | Martin | |
| 2002/0194164 A1 | 12/2002 | Morrow et al. | |
| 2003/0028525 A1 | 2/2003 | Santos et al. | |
| 2003/0033302 A1 | 2/2003 | Banerjee et al. | |
| 2003/0101083 A1 | 5/2003 | Venkatesh et al. | |
| 2003/0144895 A1 | 7/2003 | Aksu et al. | |
| 2003/0196094 A1 * | 10/2003 | Hillis et al. | 713/179 |
| 2003/0221123 A1 | 11/2003 | Beavers | |
| 2004/0107125 A1 | 6/2004 | Guheen et al. | |
| 2004/0199573 A1 | 10/2004 | Schwartz et al. | |
| 2005/0138115 A1 | 6/2005 | Llamas et al. | |
| 2005/0144151 A1 | 6/2005 | Fischman et al. | |
| 2005/0256866 A1 | 11/2005 | Lu et al. | |
| 2006/0004601 A1 | 1/2006 | Marks | |
| 2006/0013367 A1 | 1/2006 | Sawyer et al. | |
| 2006/0064486 A1 | 3/2006 | Baron et al. | |
| 2006/0106788 A1 | 5/2006 | Forrest | |
| 2006/0122992 A1 * | 6/2006 | Bellaiche et al. | 707/4 |
| 2006/0136869 A1 | 6/2006 | Lamm et al. | |
| 2006/0161524 A1 | 7/2006 | Roy et al. | |
| 2006/0167846 A1 | 7/2006 | Nevin et al. | |
| 2006/0200356 A1 | 9/2006 | Wan | |
| 2006/0252547 A1 | 11/2006 | Mizrahi et al. | |
| 2006/0277091 A1 | 12/2006 | Kochikar et al. | |
| 2006/0282304 A1 | 12/2006 | Bedard et al. | |
| 2006/0288087 A1 | 12/2006 | Sun | |
| 2007/0094228 A1 | 4/2007 | Nevin et al. | |
| 2007/0106659 A1 | 5/2007 | Lu et al. | |
| 2007/0174247 A1 | 7/2007 | Xu et al. | |
| 2007/0174254 A1 | 7/2007 | Toong et al. | |
| 2007/0179835 A1 | 8/2007 | Ott et al. | |
| 2007/0198319 A1 | 8/2007 | Sciuk | |
| 2007/0198510 A1 * | 8/2007 | Ebanks | 707/5 |
| 2007/0219995 A1 * | 9/2007 | Heumann et al. | 707/7 |
| 2007/0260587 A1 | 11/2007 | Mohan | |
| 2007/0274495 A1 | 11/2007 | Youd et al. | |
| 2007/0282781 A1 | 12/2007 | Mathiesen et al. | |
| 2007/0288292 A1 | 12/2007 | Gauger | |
| 2008/0021884 A1 | 1/2008 | Jones et al. | |
| 2008/0046394 A1 | 2/2008 | Zhou et al. | |
| 2008/0082486 A1 | 4/2008 | Lermant et al. | |
| 2008/0082607 A1 | 4/2008 | Sastry et al. | |
| 2008/0091686 A1 | 4/2008 | Beard | |
| 2008/0098109 A1 | 4/2008 | Faihe et al. | |
| 2008/0147741 A1 | 6/2008 | Gonen et al. | |
| 2008/0162376 A1 | 7/2008 | Roulston | |
| 2008/0228504 A1 | 9/2008 | Nguyen et al. | |
| 2008/0301091 A1 | 12/2008 | Hibbets et al. | |
| 2009/0063386 A1 | 3/2009 | Hibbets | |
| 2009/0187626 A1 | 7/2009 | Degaugue | |

FOREIGN PATENT DOCUMENTS

| | | | |
|---|---|---|---|
| WO | 01/35272 A2 | 5/2001 | |
| WO | 01/53970 A2 | 7/2001 | |

OTHER PUBLICATIONS

U.S. Appl. No. 11/754,520, filed May 29, 2007, N. Lee Faus et al.
U.S. Appl. No. 11/756,334, filed May 31, 2007, John R. Mattox et al.

* cited by examiner

SYSTEMS AND METHODS FOR A RATING SYSTEM

FIELD

This invention relates generally to information searching, more particularly, to systems and methods for a rating system.

DESCRIPTION OF THE RELATED ART

Searching a database is a well known and accepted practice. Initially, programs or applications were written to store data according to a schema and to access the data. Commercial products from Sybase or Oracle are examples of database system.

The Internet can be regarded in one abstraction as a large database. Search engines provide a method to enter search terms and retrieve web pages, articles, blogs, Wiki pages that have the requested search terms. Typically, the results are returned in a orderly fashion based on a ranking applied by the search engine. The order of the results can be based on the search terms or other criteria set by the search engine.

Although the search results are plentiful, there are disadvantages and drawbacks. For example, a user still has to go through each search result to determine whether the search result may be relevant to the inputted search. Often, websites can embed frequently known key words to achieve a high number of "hits" for revenue purposes. As a result, there is a lot of additional review of the search results to cull out the necessary information.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to methods and systems for a rating system. More particularly, the rating system can be configured to allow users to review and evaluate items in a knowledgebase such as software releases, articles, people, etc. The rating systems can store a rating of a reviewed item as rated by a reviewer as well as any commentary inputted by the reviewer. The rating system can also be configured to allow subsequent users to also rate and add commentary to the previously reviewed item as well as allowing the subsequent review to evaluate the existing rating and/or review.

The rating system can then be used to develop a ranking for a selected item in the knowledgebase. More specifically, the rating system can be configured to provide a secondary ranking based on subsequent evaluation of the ratings and/or reviews associated with the selected item. Accordingly, when a user requests a query of the knowledgebase, the user can be presented the most relevant knowledgebase items based on rankings.

Figure 1:
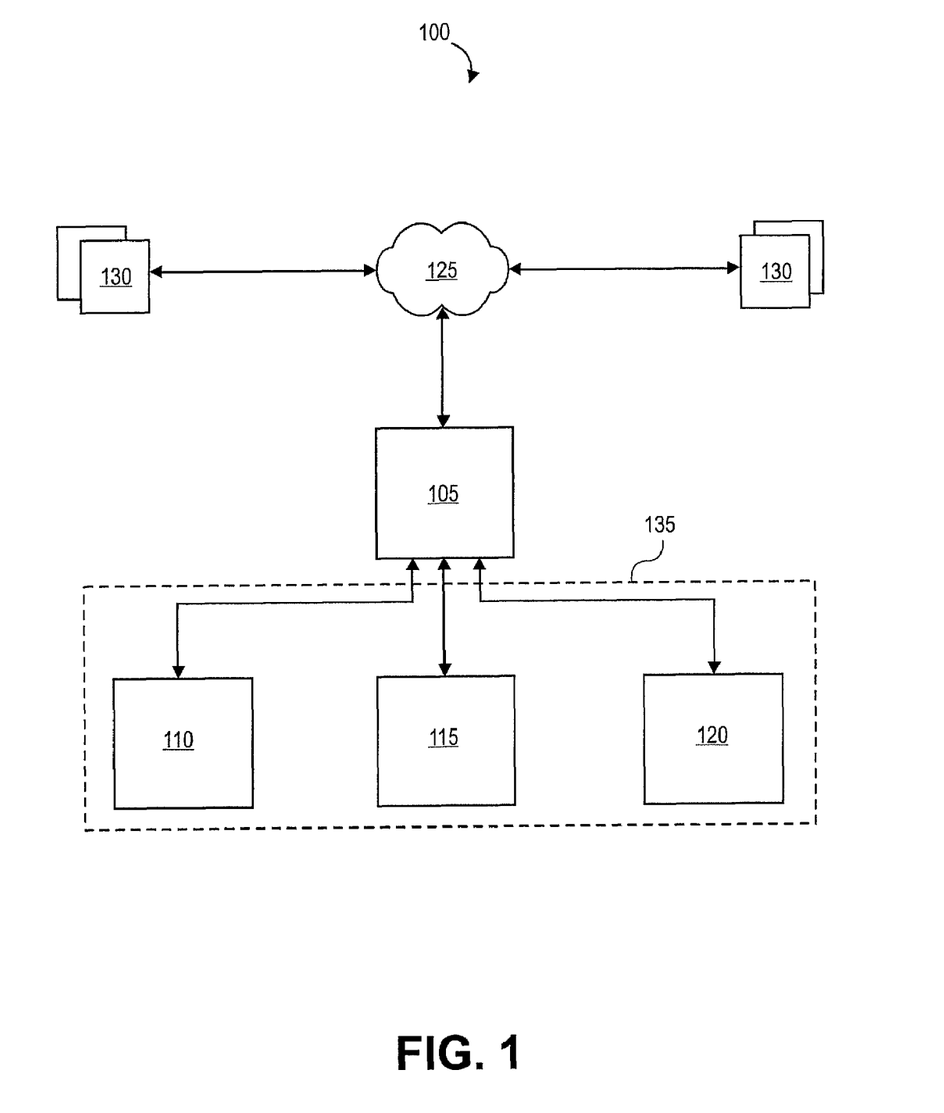
FIG. 1 depicts an exemplary system in accordance with an embodiment.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes a service portal 105 coupled to a network 125. Users 130 can interface with the service portal 105 through the network 125. The network 125 can be a combination of local area networks, wide area networks, public networks, and private networks or combinations thereof such as the Internet.

The users 130 can be interface with the service portal 105 using computing platforms such as personal computers, workstations, mobile phones, PDAs, private local area networks (e.g., business entity or government entity) or other similar device that can provide network access and interact with the service portal 105.

In some embodiments, the service portal 105 can be configured to provide services. As a non-limiting example, the service portal 105 can be configured to provide information for users to research, compare and purchase software, hardware and consulting services in support of the those software and/or hardware purchases. The service portal 105 can also be configured to provide support services by subscription to those same software and/or hardware purchases. The service portal 105 can further be configured to provide a knowledgebase for a user in a community can search for answers regarding issues. The community can comprise of registered and non-registered users.

The service portal 105 can be configured to provide at least the described services with a service backend 135. The service backend 135 can comprise at least a knowledge server 110, an issue tracker server 115 and a chat server 120.

The knowledge server 110 can be configured to provide a knowledgebase for the system 100. The knowledgebase can comprise of Wiki pages, articles, frequently asked questions, transcripts of chat sessions, forums, and other informational items related to issues deemed worth discussing by the community. The knowledge server 110 can also be configured to search and retrieve requested informational items from third party sites such as Google™, Yahoo™, etc. The knowledge server 110 can then rank and prioritize the search results from internal and external sources for the requesting user based on a single interface provided by the server portal 105. In some embodiments, the knowledge server 110 can be implemented on a separate server using open-source technologies.

The service portal 105 can also be configured to interface with the issue tracker server 115, which provides support services for the service portal 105. More particularly, a user may have a problem or issue with a purchased software and/or hardware from the service portal 105. The user can return to the service portal 105 and request support services based on a purchased service subscription through a user interface generated by the service portal 105. The service portal 105 can redirect the support request to the issue tracker server 115. The issue tracker server 115 can open an associated service ticket for resolution by support personnel. The issue tracker server 115 can also be configured to attach transcripts of any chat sessions between the support personnel and the user as well as documenting the solution(s) to the issue of the user. In some aspects, the documented solution can be converted into an article, added to a frequently asked question list, Wiki page, etc., and passed onto the knowledge server 110.

The chat server 120 can be configured to couple with the service portal 105. A user with an issue or question can log into the service portal 105 and search for solutions and/or answers. The service portal 105 can generate a user interface and display an option for requesting assistance via a chat session. If a user selects this option, the service portal 105 can pass the request over to the chat server 120. The chat server 120 can be configured to provide the chat session to the user via another user interface provided by the service portal 105. The chat server 120 can also be configured to save the chat sessions for later review. For example, support personnel can turn the chat session into an article or extract discussed solutions in the chat sessions into or add to a frequently asked questions list.

Figure 2:
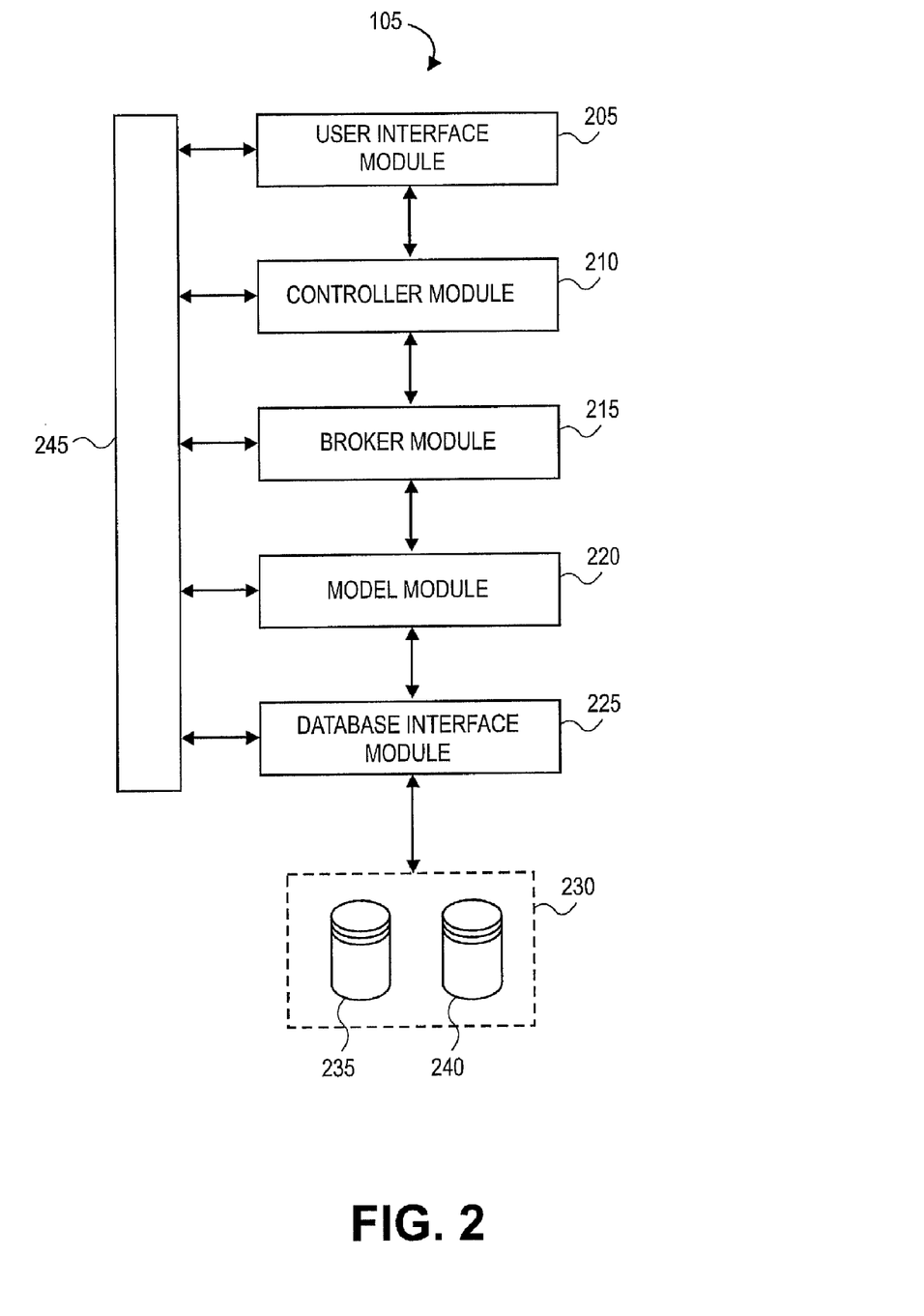
FIG. 2 illustrates an exemplary service portal of the system shown in FIG. 1 in accordance with another embodiment.

FIG. 2 illustrates a more detailed block diagram of the service portal 105 in accordance with another embodiment. It should be readily apparent to those of ordinary skill in the art that the service portal 105 depicted in FIG. 2 represents a generalized schematic illustration and that other components may be added or existing components may be removed or modified.

As shown in FIG. 2, the service portal 105 can comprise a user interface module 205, a controller module 210, a broker module 215, a business logic module 220, a database interface module 225, and a logging module 245. The user interface module 205 can be configured to generate the graphical user interfaces ("GUIs") for users to interact with service portal 105. The user interface module 205 can generate the necessary functionality of the GUIs based on hypertext markup language ("HTML") code, cascading style sheets ("CSS"), Java Server Pages ("JSP"), or any number of other well-known display technologies, including those applicable to desktop presentation.

The user interface module 205 can be configured with a controller module 210, which is configured to provide code support for the functionality embedded in the GUIs of the user interface module 205. More particularly, the controller module 210 can comprise DWR, Dojo, and a library of JavaScript apps. The controller module 210 can be implemented using direct web remoting (DWR). DWR can be considered a Java and JavaScript open source library which allows a programmer to write Asynchronous JavaScript and XML ("Ajax") web applications or interactive web applications. DWR allows generally JavaScript code in the GUI generated by the user interface module 205 to use Java methods.

The Dojo component can be considered an open-source JavaScript Toolkit to construct the dynamic web user interfaces. As such, the controller module 210 can dynamically generate user interfaces to pass along to the user interface module 205 for display to a user.

The library of JavaScript apps can define a list of predetermined functionality that users are likely to call. For example, one JavaScript can be "Get Price of Product X".

The controller module 210 can also be coupled with the broker module 215. The broker module 215 can be configured to provide a high-level business logic for the service portal 105. More particularly, the business logic can generally filter and direct an incoming request to the appropriate server of the service backend 135 (shown in FIG. 1). For example, the broker module 215 can receive a request for delivery terms on a selected piece of hardware. The broker module 215 can identify the server that can satisfy the request, e.g., service portal 105, and forward the request. Similarly, a request for technical support can be identified by the broker module 215 and be forwarded to the issue tracker server 115 to be serviced.

The broker module 215 can also be coupled with business logic 220, which is configured to contain the logic to provide the desired business services from the broker module 215 such as processing requests for the database 230. The business logic module 225 can also provide a schema for inquiries to the databases 230. The databases 230 can, abstractly, contain two databases: a user profile database 235 and a product catalog 240. The databases 230 can be implemented using any type of database systems provided by vendors such as MySQL, Oracle, Sybase, International Business Machines, etc. The business logic module 220 can provide the schema to formulate queries to pass to the databases 230 through the database interface module 225. The business logic 220 can be implemented using an open source lightweight framework such as Spring Application Framework supported by data access objects, beans, and manager.

The database interface module 225 can be configured to provide an abstraction between the databases 230 and the business logic module 220. The database interface module 225 can be implemented with Hibernate or other similar abstractions. The database interface module 225 provides object relational mapping and persistence management with the databases 230.

The modules 205-225 of the service portal 105 can also be implemented using an open source servlet container and webserver such as Tomcat™ in some embodiments. Other embodiments could use proprietary servlet container and webserver technologies.

The logging module 245 can be configured to couple with the user interface module 205, the controller module 210, the broker module 215, the business logic module 220 and the database interface module 225. The logging module 245 can also be configured to provide logging and exception handling for all the coupled modules 205-225. The aforementioned module can provide functions which may be commonly called by the rest of the modules 205-225 of the service portal 105. The logging module 245 can be implemented using aspect-oriented programming as known to those skilled in the art.

Figure 3:
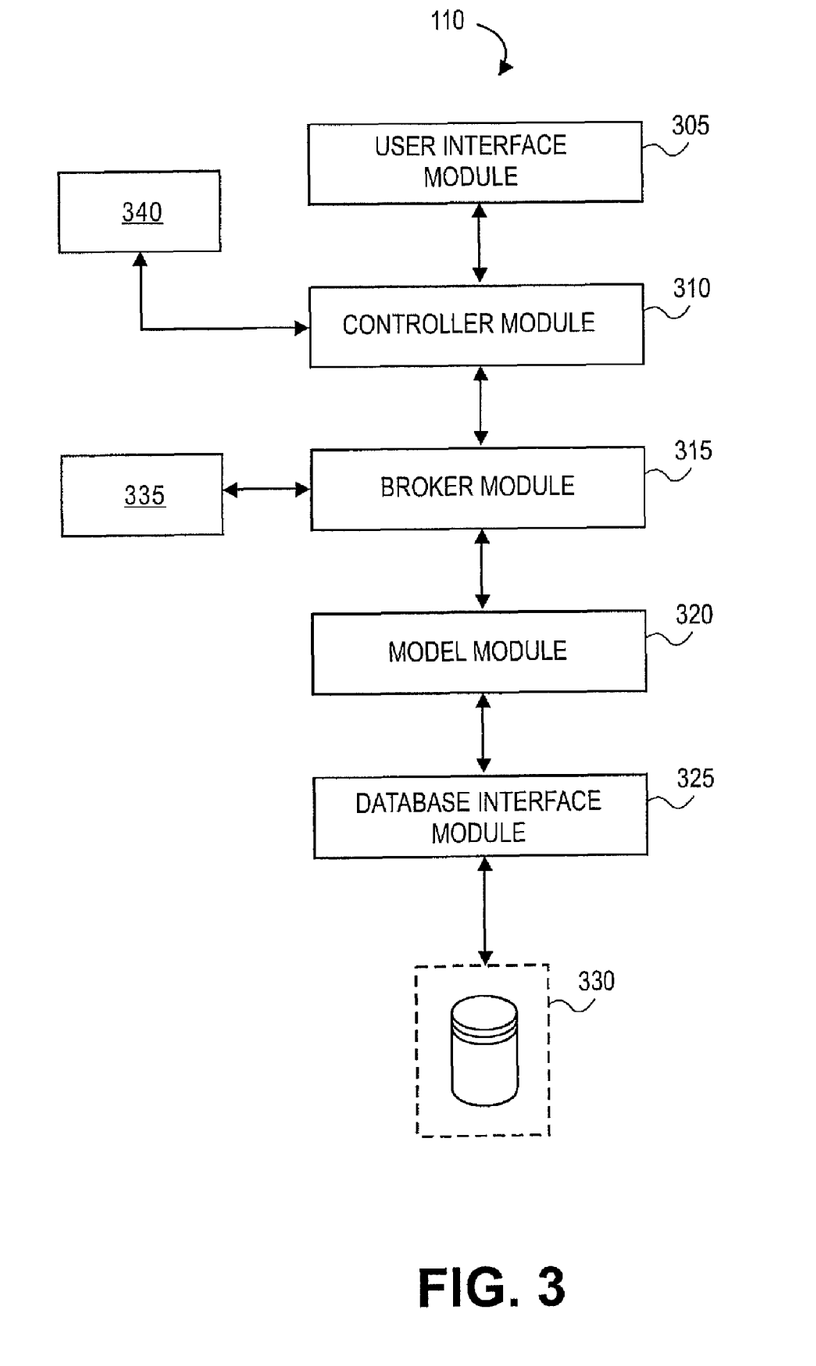
FIG. 3 depicts an exemplary knowledge server of the system shown in FIG. 1 in accordance with yet another embodiment.

FIG. 3 illustrates a more detailed block diagram of the knowledge server 110 in accordance with another embodiment. It should be readily apparent to those of ordinary skill in the art that the knowledge server 110 depicted in FIG. 3 represents a generalized schematic illustration and that other components may be added or existing components may be removed or modified.

FIG. 2 and FIG. 3 share some common components. As such, the description of the common components is being omitted and the description of these components with respect to the FIG. 2 is being relied upon to provide adequate description of the common components.

As shown in FIG. 3, the knowledge server 110 can comprise at least a user interface module 305, a controller module 310, a broker module 315, a business logic module 320 and a database interface module 325.

Similar to the service portal 105, the user interface module 305 of the knowledge server 110 can be configured to provide the GUIs for users to interact with the knowledge server 110. The functionality for selected actions by the users is provided by the controller module 310. The controller module 310 can be configured to provide the associated code for the requested functionality of the selected action in the GUI. The broker module 315 can be configured to provide high-level business logic for the knowledge server 110. More particularly, the broker module 315 can provide filtering for the requests entering the knowledge server 110. For these requests, the broker module 315 can receive these requests from the service portal 105 through the server interface 335. The server interface 330 can be implemented using simple object access protocols, web services, etc. The knowledge server 110 can also user the server interface 335 to return requested information to the service portal 105. Unlike the service portal 105, the knowledge server 110 can be configured to prevent direct access to the knowledge server 110 but can only be accessed through the service portal 105.

The broker module 315 of the knowledge server 110 can also be coupled to the business logic module 320, which is configured to contain the logic to provide the desired business services as received from the broker module 315 such as processing requests for the database 330. The business logic module 325 can also provide a schema for queries into the knowledgebase database 330. The database interface module 325 can be configured to provide a level of abstraction between the queries from the broker module 320 to the actual physical implementation of the knowledgebase database 330. As previously described, the knowledgebase database 330 can be implemented with database architectures provided by vendors such as MySQL, Oracle, Sybase, International Business Machines, and other similar manufacturers.

The modules 305-325 of the service portal 105 can also be implemented using an open source servlet container and webserver such as Tomcat™ in some embodiments. Other embodiments could use proprietary servlet container and webserver technologies.

Figure 4:
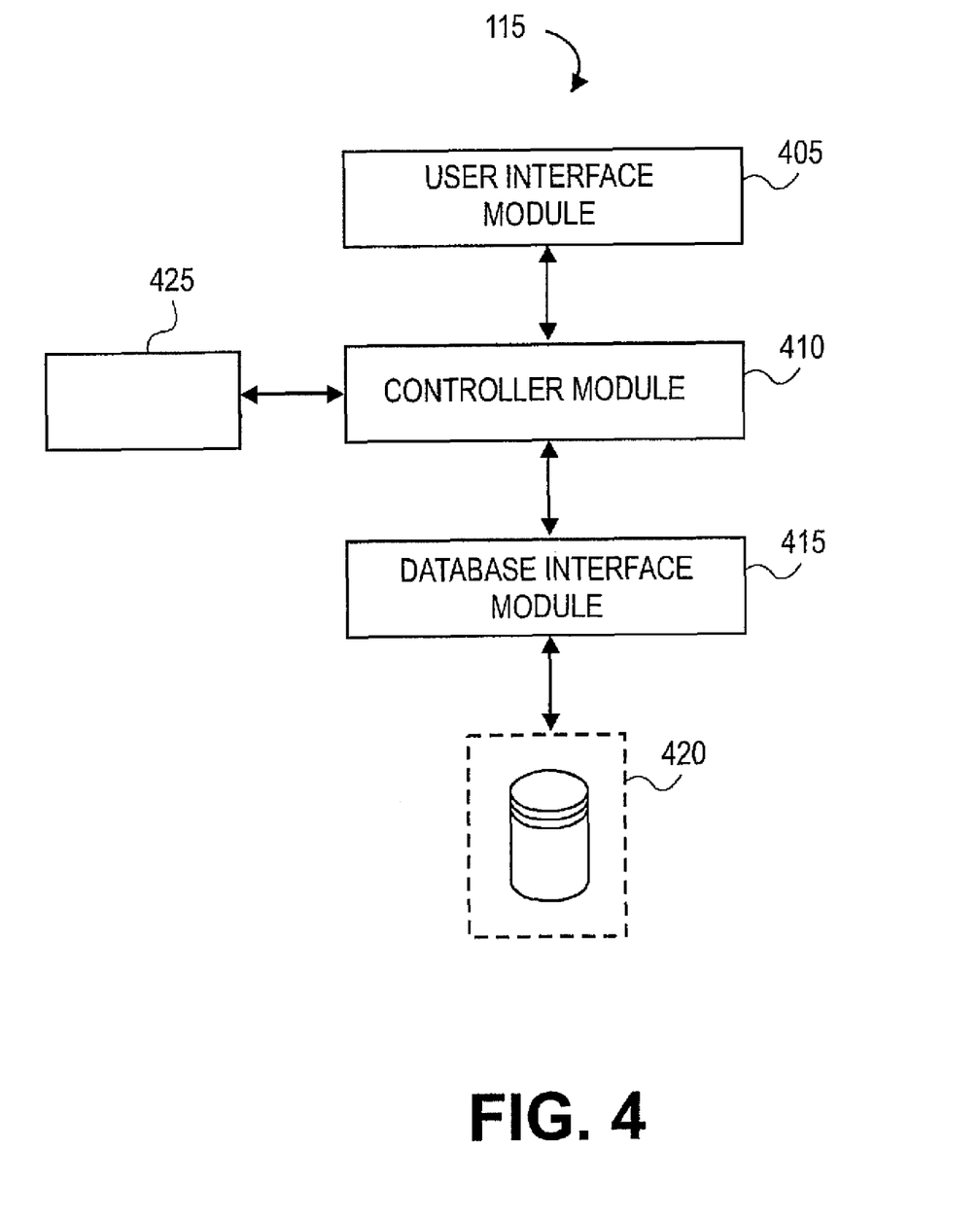
FIG. 4 illustrates an exemplary issue tracker server of the system shown in FIG. 1 in accordance with yet another embodiment.

FIG. 4 illustrates a more detailed block diagram of the issue tracker server 115 in accordance with another embodiment. It should be readily apparent to those of ordinary skill in the art that the issue tracker server 115 depicted in FIG. 4 represents a generalized schematic illustration and that other components may be added or existing components may be removed or modified.

As shown in FIG. 4, the issue tracker server 115 can comprise a user interface module 405, a controller module 410, a database interface module 415, and a server interface 425. Similar to the service portal 105 and the knowledge server 110, the user interface module 405 of the issue tracker server 115 can be configured to generate GUIs for the service portal 105 to interface thereto. As with the knowledge server 110, the service portal 105 provides a unified interface to the issue tracker server 115. The service portal 105 can be configured to receive requests from users to access the issue tracker server 115. The received requests are processed by the issue tracker server 115 and any information is returned using the issue tracker server's GUIs as generated by the user interface module 405. The service portal 105 reformats any returning information from the issue tracker server 115 and the other servers in a unified GUI generated by the user interface module 205 of the service portal 105. In some instances, the service portal 105 can generate an overlay for data arriving from the other servers (110-120). Accordingly, a user can be presented with information in a consistent format.

The user interface module 405 can be implemented using HTML code, CSS sheets, PHP: Hypertext Preprocessor ("PHP") code, Ruby on Rails (ROR), or other presentation technology. The controller module 410 can provide the associated code for the functionality provided by the GUIs generated by the user interface module 405.

The controller module 410 can be configured to communicate with the service portal 105, the knowledge server 110 and the chat server through a communication interface 425. The communication interface 425 can use SOAP or web service protocols over the Internet to provide the communication conduit.

The controller module 410 can also be configured to interface with the database 420. The database 420 can be configured to store the open and closed service tickets. The database 420 can also be configured to store links to or the actual articles or chat sessions used to resolve the issue. In some embodiments, the database 420 can be implemented using MySQL 5.x database or other open source database. Other embodiments, the database 420 can be implemented using proprietary databases such as Oracle, Sybase, IBM, etc.

Although FIG. 4 depicts the user interface module 405, controller module 410, and the database interface module 415 as separate components, these modules (405-415) can be implemented using LAMP, which is an open source Web development platform based on Linux, Apache, MySQL, and PHP/Python/Ruby.

Figure 5:
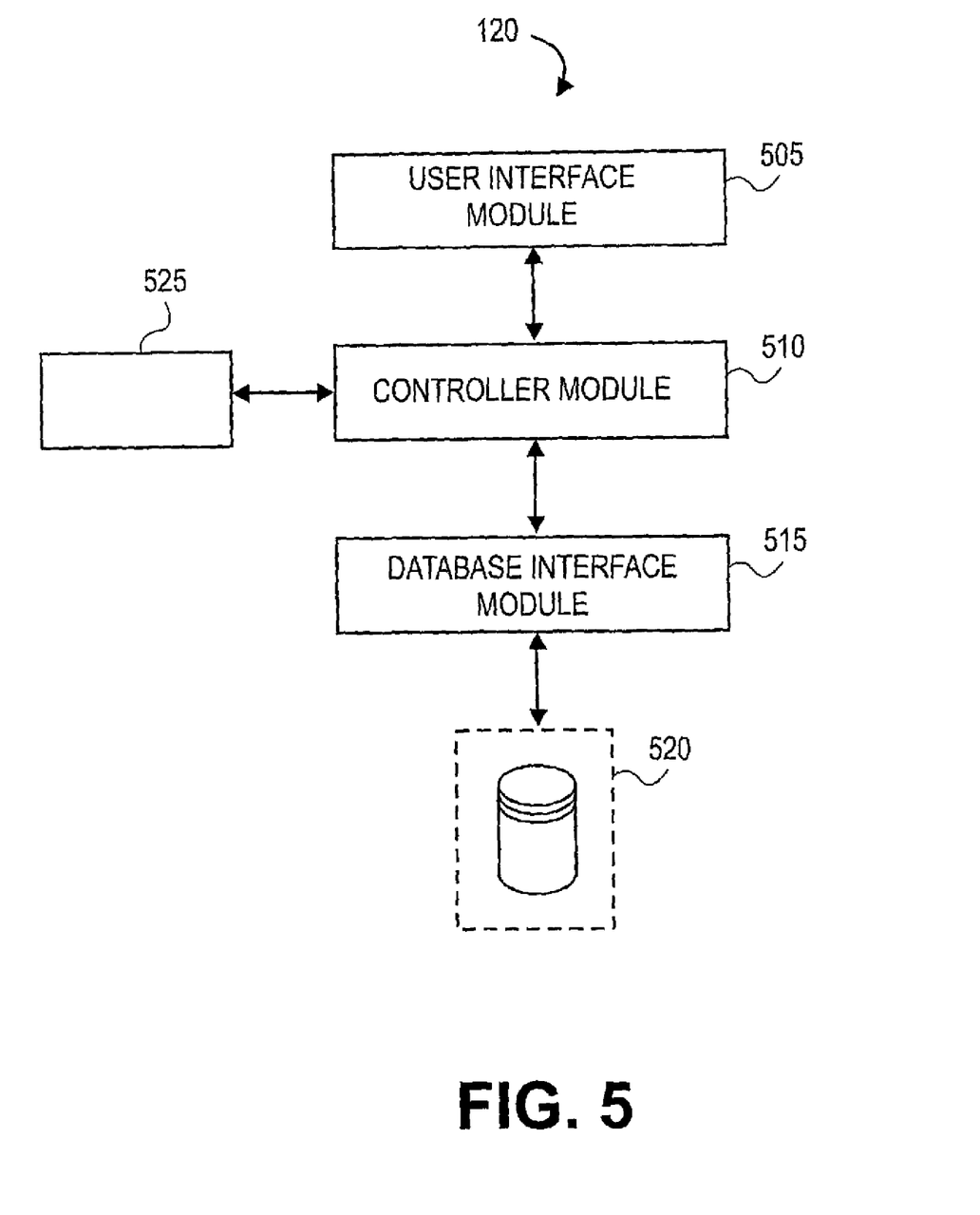
FIG. 5 depicts an exemplary chat server of the system shown in FIG. 1 in accordance with yet another embodiment.

FIG. 5 illustrates a more detailed block diagram of the chat server 120 in accordance with another embodiment. It should be readily apparent to those of ordinary skill in the art that the chat server 120 depicted in FIG. 5 represents a generalized schematic illustration and that other components may be added or existing components may be removed or modified.

The chat server 120 can be configured to provide chat services for users. The chat server 120 can provide a communication link between users and a group of support personnel. The chat server 120 can also provide a communication link between users of the service portal 105. The users can request access to support through a GUI of the service portal 105. Some embodiments can use Openfire to provide group and instant messaging service using the extensible Messaging and Presence Protocol ("XMPP").

As shown in FIG. 5, the chat server 120 can comprise a user interface module 505, a controller module 510, a database interface module 515 and a database 520. The user interface module 505 of the chat server 120 can be configured to generate GUIs for the service portal 105 to interface thereto. The user interface module 505 can be implemented using HTML code, CSS, Java Server pages, and/or other presentation technologies.

As with the knowledge server 110 and the issue tracker server 115, the service portal 105 provides a unified interface to the chat server 120. The service portal 105 can be configured to receive requests from users to access the chat server 115. The received requests are processed by the chat server 120 to start a chat session with someone from a group of technical support personnel.

The received requests for chats can be processed by the controller module 510, which contains the associated code for the selected function in the GUI by a user. The controller module 510, in some embodiments, can be implemented using DWR.

The controller module 510 can also interface with a database interface module 515. The database interface module 515 can be configured to translate queries from the controller module 510 to appropriate format of the database 520 to store and retrieve information. The information stored in the database 520 can comprise of chat sessions between users and support personnel. In some embodiments, the database 520 can be implemented with a MySQL database. Returning to the database interface module 515, this module 515 can be implemented using plain old Java objects as known to those skilled in the art.

Although FIG. 5 depicts the user interface module 505, controller module 510, and the database interface module 515 as separate components, other embodiments can implement the functionality of these modules can be implemented using Tomcat Servlet container and web server from Apache Software Foundation.

Returning to FIG. 3, the knowledge server 110 can be configured with a ratings module 340 embedded in the controller module 310. The rating module 340 can be configured to provide a mechanism for users to rate and comment on a knowledgebase item but also to rate the initial rating and commentary on the knowledgebase item. The ratings module 340 can be configured to allow a reviewer to assign a rating on a predetermined scale (e.g., one to five stars) to the knowledgebase item as well attach any commentary regarding the knowledgebase item (e.g., effectiveness, ease of use, etc.).

The ratings module 340 can also be configured allow subsequent reviewers/users to provide a secondary evaluation of the knowledgebase item as well as the initial rating and associated commentary. A subsequent user can assess the knowledgebase item as well as the initial reviewer rating and associated commentary.

The ratings module 340 can be further configured to provide a ranking based on the rating, associated commentary and the secondary ratings based on a predetermined formula or heuristic. For example, one heuristic could be to place greater weight to the secondary ratings than initial rankings and/or associated commentary. The predetermined formula or heuristic can be tailored to the needs and goals of the user as known to those skilled in the art.

As the ranking of the knowledgebase item increases, this indicates that the user community knowledgebase item is a credible source of information and the author of the associated commentary gains status as an expert. Conversely, if the ranking falls, this is an indication that the user community does not deem the knowledgebase item worthwhile and/or the reviewer worthwhile. The ranking of the knowledgebase item can also be used as a method of displaying search results from the knowledgebase. More particularly, when the knowledgebase returns search results, the results are ordered according to ranking. Accordingly, the user community can provide a verification mechanism to assess the knowledgebase item as well as initial reviewers.

Figure 6:
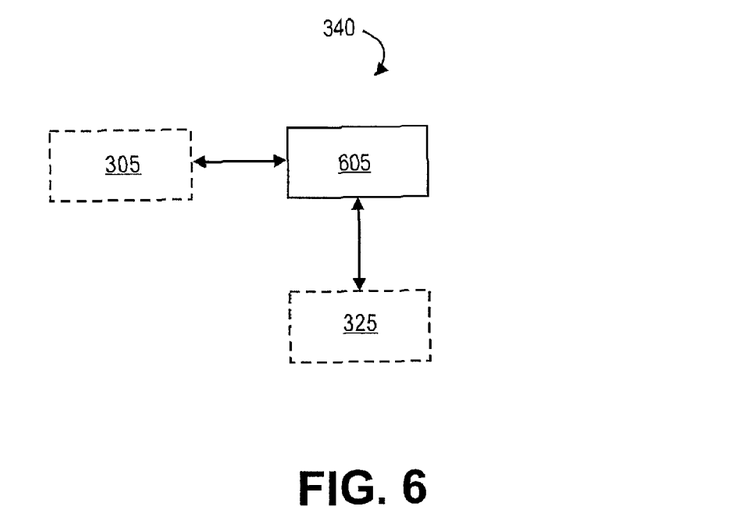
FIG. 6 illustrates an exemplary diagram of the forum module in accordance with yet another embodiment.

FIG. 6 illustrates a block diagram of the ratings module 340 in accordance with yet another embodiment. It should be readily apparent to those of ordinary skill in the art that the ratings module 340 depicted in FIG. 6 represents a generalized schematic illustration and that other components may be added or existing components may be removed or modified.

As depicted in FIG. 6, the ratings module 340 is comprised of a manager module 605 coupled to the user interface module 305, and the database interface module 325. The manager module 605 is configured to implement the functionality of the ratings module 340 as previously described and described in greater detail below with respect to FIGS. 7-8. The manager module 605 can be implemented in software code (Java, C, C++, etc.), hardware device (application specific integrated circuit, field programmable gate array, microprocessor, etc.) or combinations thereof.

Although manager module 605 is depicted as a separate module in FIG. 3, it is readily obvious to those of ordinary skill in the art that the functionality of the manager module 605 can be implemented within the controller module 310 or the broker module 315 without departing from the teachings of the present invention.

The manager module 605 can access the user interface module 305 through the existing controller module 310 interfaces with the user interface module 305 as previously described. The user interface module 305 can be configured to generate GUIs to allow a user to, among other things, search the knowledgebase database 330 (i.e., knowledgebase), review ratings and associated reviews (or commentary) of selected knowledgebase items, and to display search results.

The manager module 605 can be configured to access the database 330 through the existing pathways between the controller module 310 and the database interface module 325 as previously described and known to those skilled in the art. Accordingly, the manager module 605 can issue requests to the knowledgebase database 330 to search and retrieve items from the knowledgebase database 330.

In some embodiments, the knowledgebase database 330 can be configured to store Wiki pages, articles, blogs, etc., and associated metadata for the knowledgebase items. The associated metadata can include, among other things, tags, rating information, commentary, and/or a ranking.

The manager module 605 can be configured to invoke the GUI module 305 to generate a GUI requesting a user to evaluate a selected knowledgebase item. The selected knowledgebase item can either be a new item in the knowledgebase database 330 or a previously reviewed item.

If the user is evaluating a new item, the GUI module 305 can be configured to generate a GUI requesting the user to rate the knowledgebase item (e.g., one to five stars) and request a commentary or review of the same. The generated GUI can be configured to require that the user enter the rating and the associated commentary for the reviewed knowledgebase item.

The manager module 605 can then pass a request to store the requested rating and commentary in the knowledgebase database 330 through the database interface module 325. The manager module 605 can also place a link or pointer in the metadata associated with the selected knowledgebase item so the rating and commentary can be subsequently retrieved. The manager module 605 can be further configured to generate an initial ranking based on the rating and commentary and store this ranking in the metadata of the selected knowledgebase item.

If the user reviews a previously reviewed knowledgebase item, the manager module 605 can be configured to invoke the GUI module 305 to generate a GUI requesting the user to evaluate the previously given rating and commentary as a secondary rating. The GUI can request the user to evaluate whether the rating/commentary were accurate, helpful, useful, and other user-determined criteria.

After the user inputs the secondary rating, the manager module 605 can be configured to store the secondary rating in the knowledgebase database 330 through the database interface module 325. The manager module 605 can also store a link or pointer to the location of the secondary rating in the knowledgebase database 305 in the metadata of the knowledgebase item. The manager module 605 can be further configured to recalculate the ranking of the knowledgebase item that accounts for the secondary rating, which is subsequently stored in the metadata or a pointer to where the secondary rating is stored in the knowledgebase database 330.

Accordingly, subsequent users can search the knowledgebase database 330 and be displayed search results based on the ranking. The items with the high ranking indicate that these items have been vetted by the user community and are very useful or to whatever criteria that the user community sets. The lower ranking of items can indicate that these items are unreliable, useful or haven't been reviewed enough.

Figure 7:
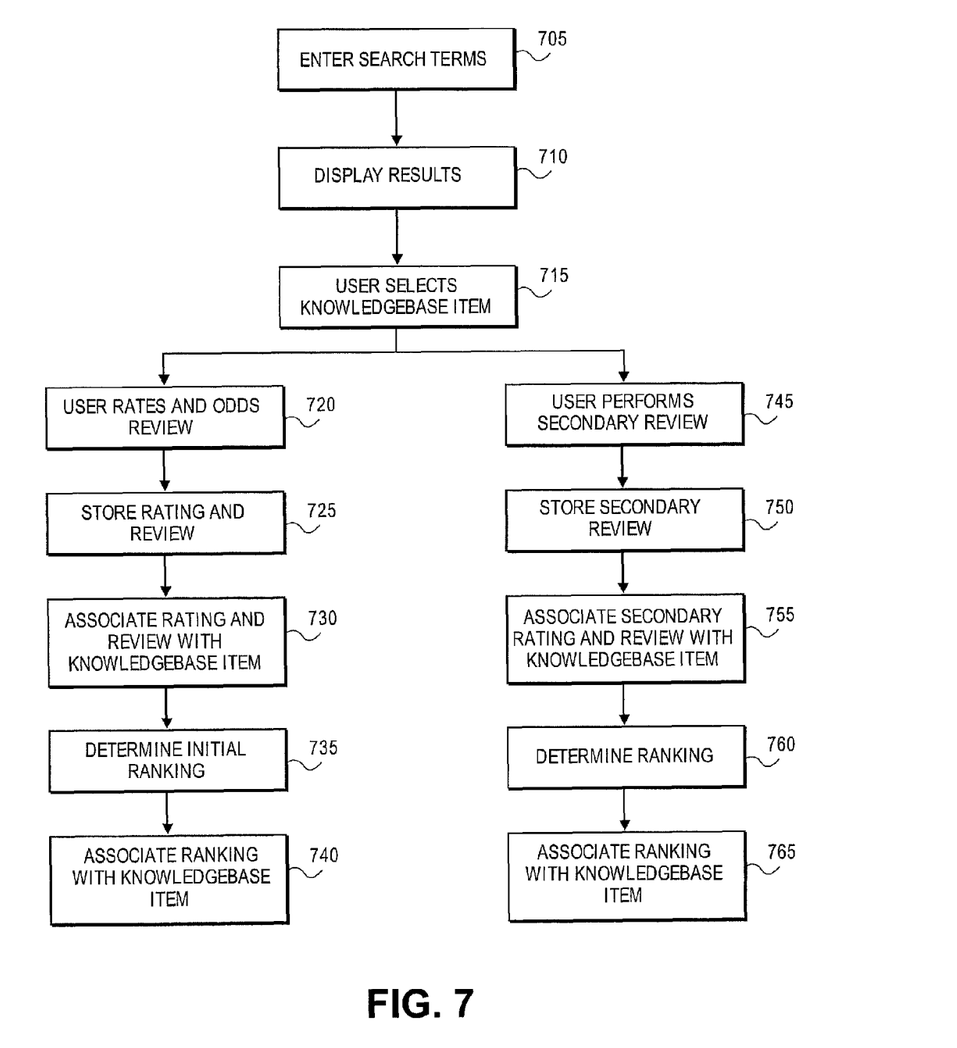
FIG. 7 depicts an exemplary flow diagram implemented by the forum module in accordance with yet another embodiment.

FIG. 7 illustrates a flow diagram 700 implemented by the ratings module 340. It should be readily apparent to those of ordinary skill in the art that the flow diagram 700 depicted in FIG. 7 represents a generalized schematic illustration and that other steps may be added or existing steps may be removed or modified.

As shown in FIG. 7, a user can be reviewing a new or a previously un-reviewed knowledgebase item by entering search terms, in step 705. More particularly, the user may have accessed the service portal 105 through their local computer via a web browser such as Opera, Mozilla, Internet Explorer, or other similar web browser applications. The service portal 105 presents a GUI for the user to search for items in the knowledgebase database 330 of the knowledge server 110. The service portal 105 can be configured to process the request for the selected query to the controller module 215 of the service portal 105 and forward the request to the knowledge server 110 through the server interface 335.

The knowledge server 110 can be configured to process the request through the broker module 315 of the knowledge server 315, which passes the request through the business logic module 320 and database interface module 325. The items matching the request are returned from the knowledgebase database 330, and possibly other third-party sources, that can then be returned to the service portal 105, in step 710.

The user module 205 of the service portal 105 can be configured to generate a GUI that displays the search results. The search results can be displayed by ranking as well as showing a graphical indicator whether or not the selected item has been rated or previously viewed. The user or reviewer may then select a new or previously un-reviewed knowledgebase item from the search results, in step 715.

If the user selects an un-reviewed knowledgebase item, in step 715, the user can evaluate the selected knowledge item, with a numerical and/or alphabetical designation representing the rating of the knowledgebase item after an examination thereof. More particularly, the manager module 605 can be configured to invoke the GUI module 305 to generate a GUI that displays a rating panel, which is configured to receive a rating by the reviewer. For example, the rating panel or box can contain a number of checkboxes associated with a numerical scale (e.g., one-to-five, one-to-ten, etc., where the higher number indicates greater satisfaction or utility). Accordingly, the user can select a rating for the selected knowledgebase item.

In some embodiments, the generated GUI can be configured to require that the reviewer also input a commentary or review of the selected knowledgebase item. For example, the generated GUI can be configured not to proceed until a reviewer enters a review. The review can be an assessment of the accuracy, ease of understanding, a utility factor of the knowledgebase item, or other predetermined criteria set by a system administrator.

In step 725, the manager module 605 can be configured to store the rating and review in the knowledgebase database 330 by utilizing the database interface module 325. More particularly, a request to store the rating and review can be formulated by the manager module 605 for the database interface module 325 to execute. The database interface module 325 can return the location of the stored rating and review to the manager module.

In step 730, the manager module 605 can be configured to associate the selected rating and review with the selected knowledgebase item. More particularly, the rating and review given by the reviewer can be associated with the knowledgebase item by placing a link or pointer to the location of the rating and review in the metadata of the knowledgebase item in some embodiments.

In step 735, the manager module 605 can be configured to determine an initial ranking of the selected knowledgebase item. More specifically, the manager module 605 can use a predetermined formula or heuristic to determine the ranking of the selected knowledgebase item. The formula or heuristic can weigh the rating along with the presence of keyword in the review to arrive at a ranking.

In step 740, the manager module 605 can be configured to associate the ranking of the selected knowledgebase item by either placing a link to the location where the item is stored (e.g., knowledgebase database 330, or other predetermined persistent memory location) or storing the ranking in the metadata associated with the selected knowledgebase item. Subsequently, the selected knowledgebase item is committed to the knowledgebase database 330 with the updated metadata.

Returning to step 715, if the user selects a previously reviewed knowledgebase item, the manager module can be configured to request the GUI module 305 to generate another GUI. This GUI can be configured to query the user to perform a secondary review on the selected knowledgebase item.

In step 745, the manager module 605 can be configured to accept the secondary review. More specifically, the user may be requested to input an evaluation of the previous rating and commentary. For example, the user can be asked to place a rating on whether the rating was accurate, the review or commentary useful, or other user-defined goal. The user can use a rating panel box that accepts a alpha-numeric designation (e.g., number of stars, a scale of numbers, etc.) to capture the secondary review. In some embodiments, the secondary review can also include commentary added by the reviewer.

In step 750, the manager module 605 can be configured to store the secondary rating and review in the knowledgebase database 330 by utilizing the database interface module 325. More particularly, a request to store the secondary rating and review can be formulated by the manager module 605 for the database interface module 325 to execute. The database interface module 325 can return the location of the stored secondary rating and review to the manager module 605.

In step 755, the manager module 605 can be configured to associate the secondary rating and review with the selected knowledgebase item. More particularly, the secondary rating and review given by the reviewer can be associated with the knowledgebase item by placing a link or pointer to the location of the rating and review in the metadata of the knowledgebase item.

In step 760, the manager module 605 can be configured to re-evaluate the existing ranking of the selected knowledgebase item. More specifically, the manager module 605 can use the predetermined formula or heuristic to re-evaluate the ranking of the selected knowledgebase item. An example of this re-evaluation can include the number of positive secondary reviews, which increases the ranking of the selected knowledgebase item.

In step 765, the manager module 605 can be configured to associate the ranking of the selected knowledgebase item by either placing a link to the location where the revised ranking is stored (e.g., knowledgebase database 330, or other predetermined persistent memory location) or storing the revised ranking in the metadata associated with the selected knowledgebase item. Subsequently, the selected knowledgebase item is committed to the knowledgebase database 330 with the updated metadata.

Figure 8:
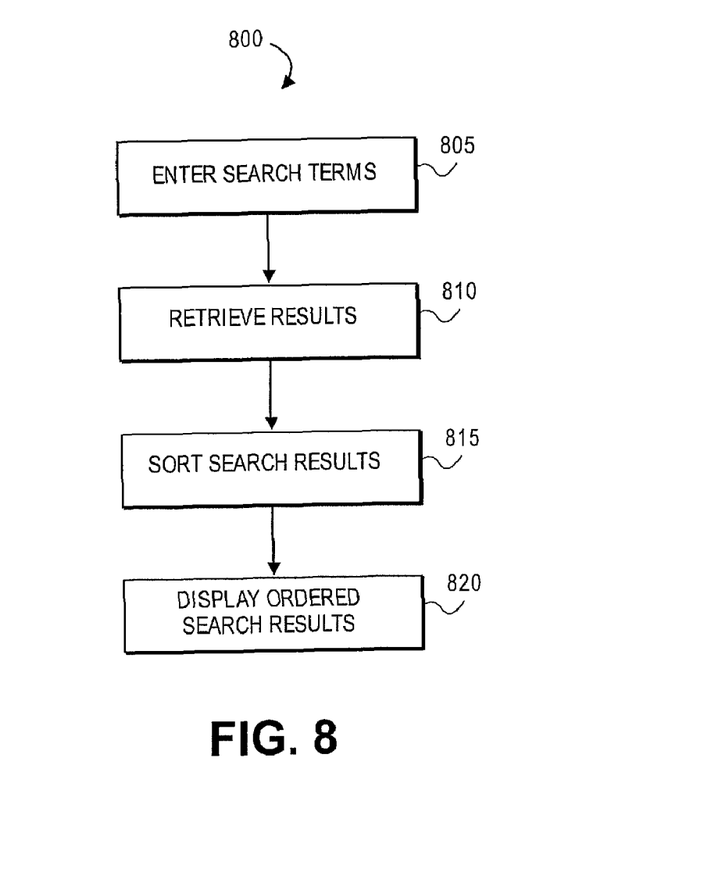
FIG. 8 illustrates another exemplary flow diagram implemented by the forum module in accordance with yet another embodiment.

FIG. 8 illustrates a flow diagram 800 implemented by the ratings module 340 in accordance with yet another embodiment. It should be readily apparent to those of ordinary skill in the art that the flow diagram 800 depicted in FIG. 8 represents a generalized schematic illustration and that other steps may be added or existing steps may be removed or modified.

As shown in FIG. 8, in step 805, a user can enter search terms in a GUI generated by a service portal 105 to search for items in the knowledgebase database 330 of the knowledge server 110. The user can enter random terms and/or use terms from a set of community tag terms to search for information items from the knowledge server 110 onto the selected GUI.

The controller module 210 of the service portal 105 can be configured to format a request packet to the knowledge server 110, which is passed to the broker module 210 through the server interface 335 and the broker module 315 of the knowledge server 110.

The broker module 315 of the knowledge server 110 can be configured to formulate a query based on the business logic module 320 to pass to the database 330 through the database interface module 325, in step 810. More particularly, the query searches the knowledgebase database 330. In some embodiments, the knowledge server 110 can be configured to aggregate data from third party web sites with the selected tag terms. The third party web site results can be grouped and ranked with the results from the knowledgebase database 330, where the results from the certified knowledgebase 350 are prominently displayed by ranking, in step 815.

In step 820, the broker module 315 of the knowledge server 110 can forward the search results in a ranked fashion. More particularly, the results are passed onto to the service portal 105 where the results are displayed by another GUI generated by the controller module 210 of the service portal 105. In other embodiments, the service portal 105 can generate an overlay GUI to display the forwarded ranked search results.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of ranking, comprising:
   receiving an initial user's rating and commentary for a knowledgebase item;
   determining, by a processor, a ranking of the knowledgebase item based on at least one of the initial user's commentary for the knowledgebase item or the initial user's rating for the knowledgebase item;
   providing the knowledgebase item in a set of search results, wherein an order of the set of search results is based on the ranking of the knowledgebase item;
   receiving at least one of a second user's commentary or rating for the initial user's rating; and
   determining a new ranking of the knowledgebase item based on the at least one of the second user's commentary for the initial user's rating or the second user's rating for the initial user's rating.

2. The method of claim 1, further comprising:
   receiving at least one of the second user's commentary for the knowledgebase item or the second user's rating for the knowledgebase item; and
   re-determining the ranking for the knowledgebase item based on the at least one of the second user's commentary for the knowledgebase item or the second user's rating for the knowledgebase item.

3. The method of claim 1, wherein the second user's rating for the initial user's rating indicates a usefulness of at least one of the initial user's commentary or the initial user's rating.

4. The method of claim 3, further comprising storing the second user's rating for the initial user's rating.

5. The method of claim 1, further comprising separately storing the initial user's commentary for the knowledgebase item and the initial user's rating for the knowledgebase item.

6. The method of claim 1, wherein the knowledgebase item includes at least one of an article, a software release, or a chat session.

7. The method of claim 1, further comprising storing links to the initial user's rating for the knowledgebase item with metadata of the knowledgebase item.

8. A system for searching, the system comprising:
   a knowledgebase database configured to store knowledgebase items by a processor;
   a search module configured to interface with the knowledgebase database and configured to search and retrieve knowledgebase items based on search terms; and a rating module configured to
receive a first user's commentary and rating for a selected knowledgebase item,
determine a ranking of the selected knowledgebase item based on at least one of the first user's commentary for the selected knowledgebase item or the first user's rating for the selected knowledgebase item,
receive at least one of a subsequent user's commentary or rating for the first user's rating, and
determine a new ranking of the selected knowledgebase item based on the at least one of the subsequent user's commentary for the first user's rating or the subsequent user's rating for the first user's rating.

9. The system of claim 8, wherein the rating module is further configured to receive at least one of the subsequent user's commentary for the selected knowledgebase item or the subsequent user's rating for the selected knowledgebase item.

10. The system of claim 9, wherein the rating module is further configured to determine the new ranking for the selected knowledgebase item based on at least one of the subsequent user's commentary for the selected knowledgebase item or the subsequent user's rating for the selected knowledgebase item.

11. The system of claim 9, wherein the subsequent user's rating for the first user's rating indicates a usefulness of at least one of the first user's commentary or the first user's rating.

12. The system of claim 11, wherein the rating module is further configured to store the subsequent user's rating for the initial uer's rating.

13. The system of claim 8, wherein the rating module is further configured to store the first user's commentary and the first user's rating for the selected knowledgebase item.

14. The system of claim 8, wherein the selected knowledgebase item includes at least one of an article, a software release, or a chat session.

15. The system of claim 8, wherein the rating module is configured to store a link to the first user's rating for the selected knowledgebase item with metadata of the selected knowledgebase item.

16. An apparatus for assisting a search, the apparatus comprising:
a database configured to store knowledgebase items by a processor;
a manager module configured to receive a first user's commentary and rating for a selected knowledgebase item, to determine a ranking of the selected knowledgebase item based on at least one of the first user's rating or the first user's commentary for the selected knowledgebase item, and to determine a new ranking of the selected knowledgebase item based on at least one of a subsequent user's commentary for the initial user's rating or the subsequent user's rating for the first user's rating; and
a database interface coupled with the manager module and the database configured to translate queries from the manager module to search the database and retrieve knowledgebase items from the database.

17. The apparatus of claim 16, wherein the manager module is further configured to receive at least one of the subsequent user's commentary for the selected knowledgebase item or the subsequent user's rating for the selected knowledgebase item.

18. The apparatus of claim 17, wherein the manager module is further configured to determine the new ranking for the selected knowledgebase item based on the at least one of the subsequent user's commentary or the subsequent user's rating for the selected knowledgebase item.

19. The apparatus of claim 17, wherein the subsequent user's rating for the first user's rating indicates a usefulness of at least one of the first user's commentary or the first user's rating.

20. The apparatus of claim 19, wherein the manager module is further configured to store the subsequent user's rating for the first user's rating.

21. The apparatus of claim 16, wherein the manager module is further configured to store the first user's commentary and rating for the selected knowledgebase item.

22. The apparatus of claim 16, wherein the selected knowledgebase item includes at least one of an article, a software release, or a chat session.

23. The apparatus of claim 16, wherein the manager module is configured to store a link to the first user's rating for the selected knowledgebase item with metadata of the selected knowledgebase item.

* * * * *